(12) United States Patent
Hayslett et al.

(10) Patent No.: US 10,131,402 B2
(45) Date of Patent: Nov. 20, 2018

(54) INTEGRATED MID DRIVE ELECTRIC BICYCLE PROPULSION SYSTEM

(71) Applicant: GM Global Technology Operations LLC, Detroit, MI (US)

(72) Inventors: Steven L. Hayslett, Troy, MI (US); Richard J. Lannen, Royal Oak, MI (US); Lawrence G. Cole, Utica, MI (US); Shawn H. Swales, Canton, MI (US); Jiri Jager, Prague (CZ); Marek Riha, Prague (CZ); Pavel Koreckek, Prague (CZ); Cameron Philip Williams, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 14/959,607

(22) Filed: Dec. 4, 2015

(65) Prior Publication Data

US 2017/0158284 A1 Jun. 8, 2017

(51) Int. Cl.
| | |
|---|---|
| B62M 6/55 | (2010.01) |
| B62M 6/90 | (2010.01) |
| B62K 15/00 | (2006.01) |
| F16H 1/28 | (2006.01) |
| F16H 1/48 | (2006.01) |
| F16H 48/10 | (2012.01) |
| F16H 57/00 | (2012.01) |

(Continued)

(52) U.S. Cl.
CPC ............ *B62M 6/55* (2013.01); *B62K 15/00* (2013.01); *B62M 6/90* (2013.01); *B62M 11/145* (2013.01); *F16H 1/2818* (2013.01); *F16H 1/48* (2013.01); *H02K 7/116* (2013.01); *H02K 11/0094* (2013.01); *H02K 11/33* (2016.01); *F16H 48/10* (2013.01); *F16H 57/00* (2013.01)

(58) Field of Classification Search
CPC .......... B62M 6/55; B62M 6/90; B62M 11/14; B62M 11/145; B62K 15/00; F16H 1/2818; F16H 1/48; F16H 2001/2881; F16H 48/104; F16H 57/006
See application file for complete search history.

(56) References Cited

U.S. PATENT DOCUMENTS

| | | | | |
|---|---|---|---|---|
| 2,553,465 A | * | 5/1951 | Monge | ..................... B62M 6/20 475/3 |
| 5,609,071 A | * | 3/1997 | Schlumpf | ............ B62M 11/145 280/236 |

(Continued)

FOREIGN PATENT DOCUMENTS

| | | | | |
|---|---|---|---|---|
| CN | 104802914 A | | 7/2015 | |
| DE | 102016200264 A1 | * | 7/2017 | .............. B62M 6/40 |

OTHER PUBLICATIONS

DPMA, German Office Action issued in German Application No. 102016123047.2, dated Mar. 26, 2018.

(Continued)

*Primary Examiner* — Joseph M Rocca
*Assistant Examiner* — Maurice L Williams
(74) *Attorney, Agent, or Firm* — Lorenz & Kopf, LLP (57) ABSTRACT

A propulsion system may include an electric machine and a gear set that may be operatively connected with the electric machine. A crank shaft may extend through the electric machine and the gear set. A battery array may be disposed around the electric machine and the gear set.

18 Claims, 8 Drawing Sheets

(51) Int. Cl.
  *H02K 7/116* (2006.01)
  *B62M 11/14* (2006.01)
  *H02K 11/00* (2016.01)
  *H02K 11/33* (2016.01)

(56) References Cited

U.S. PATENT DOCUMENTS

| | | | | |
|---|---|---|---|---|
| 6,117,036 A * | 9/2000 | Lanzon | ............... | B60K 17/344 475/204 |
| 6,196,347 B1 * | 3/2001 | Chao | ............... | B62M 6/50 180/206.2 |
| 6,852,060 B1 * | 2/2005 | Ash | ............... | B62M 11/145 280/259 |
| 8,651,993 B1 * | 2/2014 | Watarai | ............... | B62M 6/55 475/205 |
| 9,017,201 B2 * | 4/2015 | Hino | ............... | B62M 11/04 475/5 |
| 9,608,495 B2 | 3/2017 | Timonen | | |
| 2004/0014543 A1 * | 1/2004 | Van Dor Lindo | ....... | B62M 9/04 474/160 |
| 2010/0261571 A1 * | 10/2010 | Matsuoka | ............ | F16H 1/2827 475/331 |
| 2011/0168511 A1 * | 7/2011 | Yamamoto | ............... | B62M 6/45 192/45.006 |
| 2011/0177912 A1 * | 7/2011 | Serkh | ............... | B62M 11/145 475/292 |
| 2011/0183793 A1 * | 7/2011 | Chan | ............... | B62M 6/45 474/69 |
| 2011/0237384 A1 * | 9/2011 | Hino | ............... | B62M 11/14 475/344 |
| 2013/0192264 A1 * | 8/2013 | McCune | ............ | F16H 57/0006 60/805 |
| 2015/0214813 A1 * | 7/2015 | Timonen | ............... | B62M 6/55 310/67 R |
| 2016/0339993 A1 * | 11/2016 | Hayslett | ............... | B62M 6/55 |

OTHER PUBLICATIONS

SIPO, China Office Action issued in China Application No. 201611042951.0, dated Jul. 31, 2018.

* cited by examiner

INTEGRATED MID DRIVE ELECTRIC BICYCLE PROPULSION SYSTEM

TECHNICAL FIELD

The field to which the disclosure generally relates includes electric cycles, and more particularly, includes electric cycles with mid drive propulsion systems.

BACKGROUND

An electric cycle may have various wheel arrangements and may include an on-board electric motor that can be used for propulsion of the cycle.

SUMMARY OF ILLUSTRATIVE VARIATIONS

A number of variations may involve a propulsion system that may include an electric machine and a gear set that may be operatively connected with the electric machine. A crank shaft may extend through the electric machine and the gear set. A battery array may be disposed around the electric machine and the gear set.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
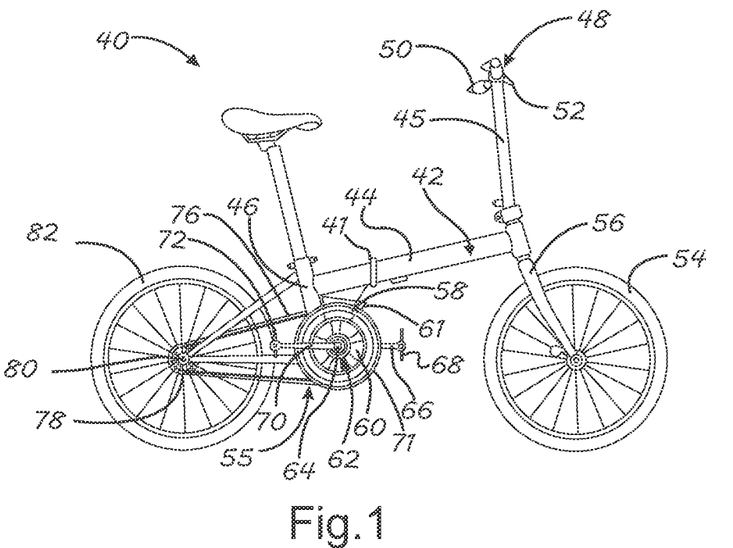
FIG. 1 illustrates an electric cycle according to a number of variations.

FIG. 1 illustrates a number of variations which may include an electric cycle 40. In any of a number of variations, the electric cycle 40 may include a frame 42 which may include a top tube 44 connected to a seat tube 46. The top tube 44 may include a hinged joint 41 to enable folding the frame 42, so that the electric cycle 40 may be more easily transported and stored. A steering tube 45 may extend from the top tube 44. The steering tube 45 may be operatively connected to a front fork 56 which may be attached to a front wheel 54. Handlebars 48 may be attached to the steering tube 45 and may be used to control the direction of the front wheel 54 by way of the front fork 56. Control levers 50 may be provided on the handlebars 48 and may be constructed and arranged to communicate with one or more input or control devices, and/or a motor. The one or more electronic control devices may include electronic processing components to receive input signals and to send out signals to control various components of the electric cycle 40, which may include sending output signals to control operation of an electric motor that may be contained in a power unit 60. In a number of variations the one or more electronic control devices may include memory, a processor and software and/or hardware to process input signals and generate output signals, and may include formulas, lookup tables or other means for comparing and processing data. The one or more electronic control devices 59 (shown in FIG. 3), may be provided in a housing 61, and may include power electronics including an inverter 57 that changes direct current from the battery to alternating current.

The electric cycle 40 may also include a propulsion system 55 that may include the power unit 60. The propulsion system 55 may also include a crank assembly 62 which may include a crankshaft 64 that may be connected with a first pedal assembly 66 and a second pedal assembly 70. The first pedal assembly 66 may include a first foot pedal 68, and the second pedal assembly 70 may include a second foot pedal 72. A linked element 71, which may be a sprocket or a pulley or another device for linking with the drive wheel 82, may be operatively connected to the crankshaft 64 for driving a linking member 76. The linking member 76 may be a chain or belt or another link suitable for engaging the linked element 71 and may be operatively connected to a rear linked element 78 which may be operatively connected to a hub 80 of the drive wheel 82. The drive wheel 82 may be a road wheel in-that it contacts the surface upon which the cycle 40 operates. The linked element 78 may be a sprocket or pulley or another device suitable for engaging with the linking member 76.

The electric cycle 40 may be constructed and arranged to allow a rider to rotate a first and second pedal assembly 66, 70 to power the electric cycle 40 or may allow a rider to use a pedal force-based propulsion system wherein the first and second pedal assemblies 66, 70 may be fixed in an approximately horizontal position so that a rider may provide intuitive input commands by applying a force to a first foot pedal 68 attached to the first pedal assembly 66 or a second foot pedal 72 attached to the second pedal assembly 70 in the clockwise or counter clockwise direction. The input commands may be intuitive to the rider and may be similar to riding a non-motorize cycle wherein the rider applies a clockwise force to a cycle crank by applying force to a forward positioned foot pedal to move the cycle in a forward direction, and the rider applies a counter clockwise force to the cycle crank by applying force to a rearward positioned foot pedal to slow the cycle. Reference herein as to clockwise or counter-clockwise is made with respect to the right hand side of the cycle with an operator facing the forward direction of movement of the electric cycle 40. The electric cycle 40 may be a bicycle, tricycle, or four-wheel electric cycle having the crank assembly 62 constructed and arranged to allow a rider to provide input thereto using the first pedal assembly 66 and the second pedal assembly 70.

Figure 2:
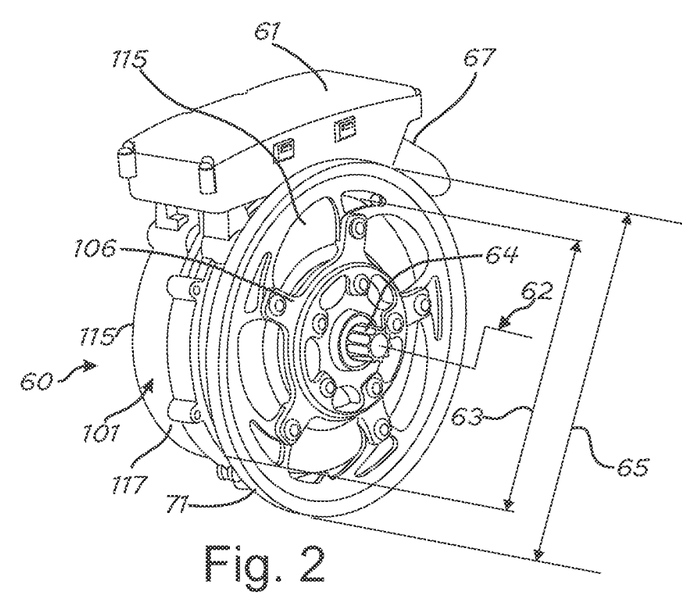
FIG. 2 illustrates an isometric view of an electric cycle power unit according to a number of variations.
Figure 3:
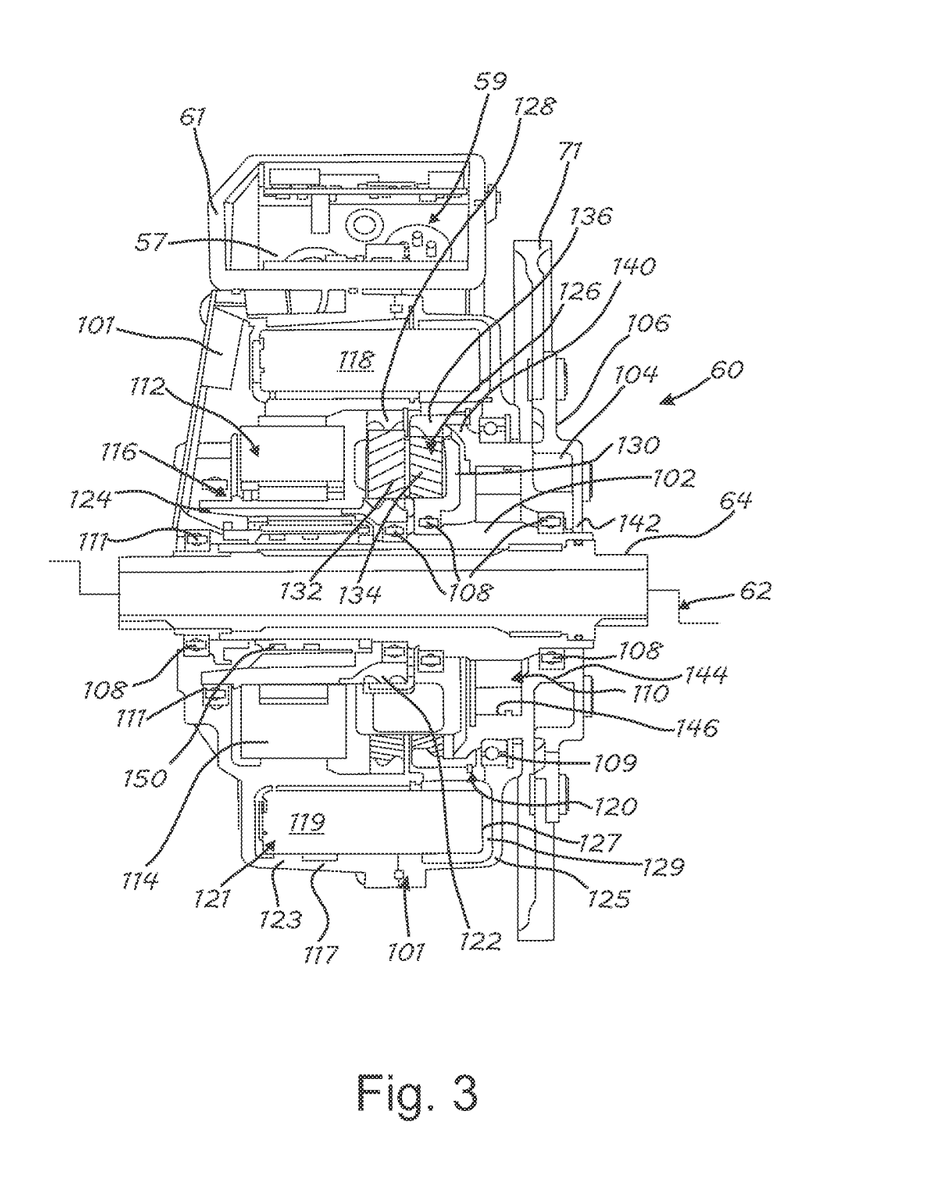
FIG. 3 illustrates a schematic outline cross section of an electric cycle power unit according to a number of variations.

Referring to FIGS. 2 and 3 along with FIG. 1, in a number of variations, the propulsion system 55 of the electric cycle 40 may include the power unit 60 that may include a case 101 for housing the various components. The case 101 may have a left section 123 that may be joined with a right section 125, with left and right determined from the perspective of a rider. The power unit 60 may be advantageously packaged to enable use on a folding frame 42. As shown in FIG. 2, the diameter 63 of the case 101 at its outermost circumference at outer peripheral wall 117 may be less than the diameter 65 of the linked element 71 at its outermost circumference, through efficient packaging of the internal components. A housing 61 may be provided at the top of the case 101, or may be formed by the case 101, to contain electronic control devices 59. The power unit 60 may be attached to the electric cycle 40 at the frame 42. The power unit 60 may carry the linked element 71, and the crank assembly 62 including pedal assemblies 66, 70 as a unit. The crank assembly 62 may be connected into the power unit 60 through a crank shaft 64. The crank shaft 64 may extend into or through the case 101 and may be operatively engaged with the linked element 71 through a torque tube identified in this variant as a torque transfer element 102. The torque tube/torque transfer element 102 may extend completely through the case 101 and may exit the left and right sides.

Figure 4:
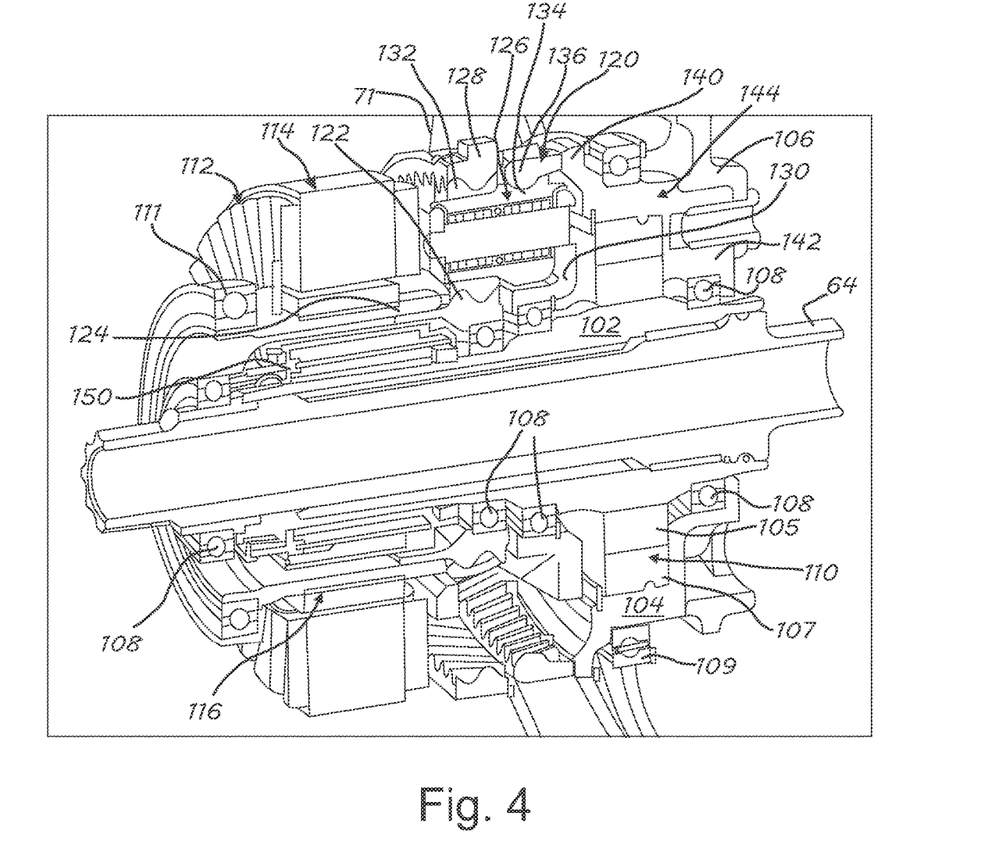
FIG. 4 illustrates an isometric, schematic, outline sectioned view of part of the electric power unit of FIG. 3.

With additional reference to FIG. 4 shown are various drive components of a number of variations with the case 101 excluded. A drive collar 104 and an adaptor 106 may also be connected to transfer torque between the crankshaft 64 and the linked element 71. The drive collar 104 may be supported to rotate by bearings 108, 109. The torque transfer element 102 may be tubular in shape, with the crank shaft 64 extending through it. A number of the bearings 108 may support the torque transfer element 102 in the power unit 60. In a number of variations four of the bearings 108 may have an inner race engaged on the torque transfer element 102. An engagement coupling 110 may be operatively connected between the torque transfer element 102 and the drive collar 104. The engagement coupling 110 may include an inner race 105 that may be fixed to the torque transfer element 102 and an outer race 107 that may be fixed to the drive collar 104. A number of locking elements (not shown), as known in the art, may be carried between the inner race 105 and the outer race 107 to lock the races in one direction of rotation and to allow relative rotation between the races in the opposite direction of rotation. The engagement coupling 110 may be configured so that when closed, torque may be transferred to the linked element 71 from the crank assembly 62. The engagement coupling 110 may operate as a one-way clutch that may be engaged so that torque may readily be transferred from the crank assembly 62 to the linked element 71. In a number of variations, the engagement coupling 110 may be a clutch and/or may include a selectively operated clutch mechanism as known in the art to provide open and closed states between the torque transfer element 102, and the drive collar 104. The engagement coupling 110 may be mechanically, electrically or otherwise actuated, or by a combination thereof. In a number of variations the engagement coupling 110 may allow the drive collar 104 to overrun the torque transfer element 102.

In a number of variations the power unit 60 may include an electric machine 112 that may be an electric motor/generator, which may be used to propel the electric cycle 40 and to generate electricity, such as through regenerative braking. The electric machine 112 may include any of a number of types of motor/generators including, but not limited to, a permanent magnet AC motor. The electric machine 112 may be an alternating current device supported by inclusion of the inverter 57, and may have low torque ripple. The electric machine 112 may include a stator assembly 114 and a rotor assembly 116. The rotor assembly 116 may rotate within the stator assembly 114 which may be held or grounded to a case 101 and which may include a number of windings. The electric machine 112 may be powered by a battery or any number of batteries or battery assemblies. The power unit 60 may include batteries 118, 119 that may be part of battery set or pack referred to as battery array 121. The battery array 121 may be disposed in a circular pattern around the inside of the power unit 60 adjacent an outer peripheral wall 117 at the reference number 115 of FIG. 2. The battery array 121, including batteries 118, 119, may be positioned between the outer peripheral wall 117 of the case 101, and the electric machine 112 and a gear set 120. Each of the batteries in the array, including batteries 118, 119 may have its end 127, on the side of the linked element 71, covered by an insulation shell 129 to reduce heat transfer between the battery and the case 101. As shown in FIG. 2, an electrical connector 67 may be connectable with, or provided on, the housing 61 for charging the battery array 121 from an external source.

Figure 5:
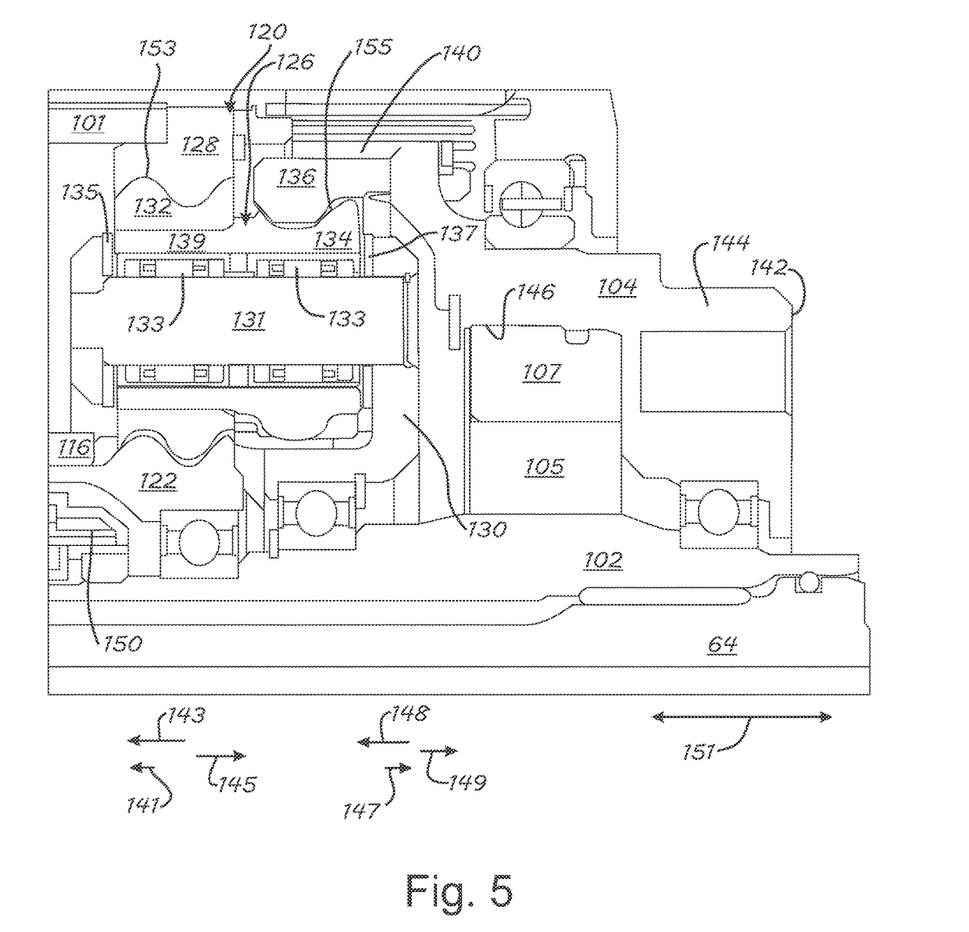
FIG. 5 illustrates an outline sectioned view of part of the electric power unit of FIG. 3.

In a number of variations, one or more gear sets 120 may be located within the power unit 60 radially inside the battery array 121. In one variation, the gear set 120 may be a planetary gear set, which may be operatively connected with the electric machine 112, and may be used to provide select gear ratios between the electric machine 112 and the linked element 71. The gear set 120 may be disposed around the crank shaft 64 adjacent the electric machine 112. Both the gear set 120 and the electric machine 112 may be housed within a space defined radially inside the battery array 121. In a number of variations, the gear set 120 may include a gear 122 that may be a sun gear, and which may be operatively engaged with the rotor assembly 116 through a rotor tube identified as torque transfer element 124. The torque transfer element 124 may be supported on the case 101 for rotation by a bearing 111. The gear 122 may be supported to rotate relative to the torque transfer element 102 with one of the bearings 108 positioned in between. The gear 122 may be operatively engaged with one or more gears 126, which may be planet gears and which may positively mesh with the gear 122 so that when the gear 122 is rotated, it may cause the one or more gears 126 to rotate. The one or more gears 126 may mesh within a gear 128, which may be a reaction ring gear that may be held, and/or may be grounded to the case 101. In a number of variations, the one or more gears 126 may be operatively connected to a carrier 130 and may cause the carrier 130 to rotate when the one or more gears 126 may be rotated within the gear 122. The carrier 130 may be supported in a rotatable state relative to the torque transfer element 102 with one of the bearings 108 positioned in between. In a number of variations there may be three of the one or more gears 126, each of which may be carried on pins of the carrier 130 with supporting needle roller bearings as shown in FIG. 5. The one or more gears 126 may be stepped pinion gears with a larger diameter pinion 132 positively meshing with the gear 128, and a smaller diameter pinion 134 engaged with a gear 136 that may be a ring gear with internal teeth that may positively mesh with the pinion 134. The gear 136 may connected to the drive collar 104. In a number of variations the gear 136 may be an output gear of the gear set 120. The gear 136 and the gear 128 may have a different number of teeth.

In a number of variations the gear set 120 may be driven by the electric machine 112 through the rotor assembly 116, the torque transfer element 124 and the gear 122. The gear set 120 may be operatively connected with the linked element 71 through the gear 136, the drive collar 104, and the adaptor 106. The linked element 71 may drive, or be driven by, the rear linked element 78 through the linking member 76. Accordingly, the electric machine 112 may drive, or be driven by, the linked element 71 through the gear set 120. In a number of variations, the engagement coupling 110 may be constructed and arranged so that when closed, torque to the linked element 71 may be generated by rotation of the rotor 102, and recovery torque may be passed from the rear linked element 78 to the electric machine 112, which may then operate as a generator.

Referring additionally to FIG. 5, in a number of variations the gears 126 may each be mounted on the carrier 130 by a pin 131 that may be fixed to the carrier 130. A number of needle roller bearings 133 may be disposed between the gear 126 and the pin 131. The gear 126 may be comprised of the stepped pinions 132 and 134. The pinion 132 may be manufactured as a separate piece and may be mounted onto a tubular shaft 139 that may extend from the pinion 134. The pin 131 may pass through a thrust washer 135, which may be positioned between the carrier 130 and the gear 126. The pin 131 may pass through another thrust washer 137 that may be positioned at an opposite end of the gear 126 from the thrust washer 135. The thrust washer 137 may be disposed between the gear 126 and the carrier 130. The thrust washers 135 and 137 may carry axial loads on the gear set 120 and in particular loads that may be inherent in helical gears due to moving points of contact across the meshing teeth as the gears rotate. The gear set 120 may provide a gear ratio of 20:1 between the gear 122, which may be a sun gear, and the gear 136, which may be an output ring gear. Each of the gears 122, 128, 136 and each of the pinions 132, 134 may be helical gears for reduced noise and vibration. In operation, the gear set 120 may incur a torque 141 that may be applied to the gear 122, a torque 143 that may be applied to the gear 128, and a torque 145 that may be applied to the gear 136. The torques 141, 143 and 145 may result in thrusts on the gear set 120 applied in an axial direction 151. An axial thrust force 147 may be applied by the gear 122 to the pinion 132. An axial thrust force 148 may be applied by the gear 128 to the pinion 132. An axial thrust force 149 may be applied by the gear 136 to the pinion 134. In a number of variations the axial thrust forces on the gear 126 and thus on the carrier 130 may be reduced or eliminated by using a unique combination of helix angle 153 for the pinion 132 and helix angle 155 for the pinion 134, with the same handedness. As will be understood, the handedness of the pinions 132, 134 may be switched. The helix angles and handedness of the pinions 132 and 134 may vary to the extent necessary so that the generated thrust forces cancel. As the result, the carrier 130 may be free of axial thrust forces and the thrust washers 135 and 137 may be unloaded or substantially unloaded.

In a number of variations the drive collar 104 may be drum shaped and may be disposed around the crank shaft 64, which may pass through the drive collar 104. An inboard rim 140 of the drive collar 104 may be connected to, or formed with, the gear 136. A stepped section 144 of the drive collar 104 may extend out of the case 101. An outboard rim 142 of the drive collar 104 may engage with, and may be connected to, the adaptor 106. The engagement coupling 110 may be disposed within an annular area 146 defined by the drive collar 104.

In a number of variations, a torque measurement device 150 may be constructed and arranged to sense or measure torque and may include, but not be limited to, a strain gauge that operates as known in the art. The torque measurement device 150 be operatively connected between the case 101 and the torque transfer element 102, and may be used to measure the reaction torque from pedal input on crank assembly 62. This may provide data via the measured torque on how hard the rider is pedaling, which may be used to determine when and how much electric drive assist to provide. The torque measurement device 150 may measure reaction torque in response to the rider input torque through the crank assembly 62. The torque measurement device 150 may be used to control the operation of at least one of propulsion by the electric machine 112, or regenerative braking through the electric machine 112.

Figure 6:
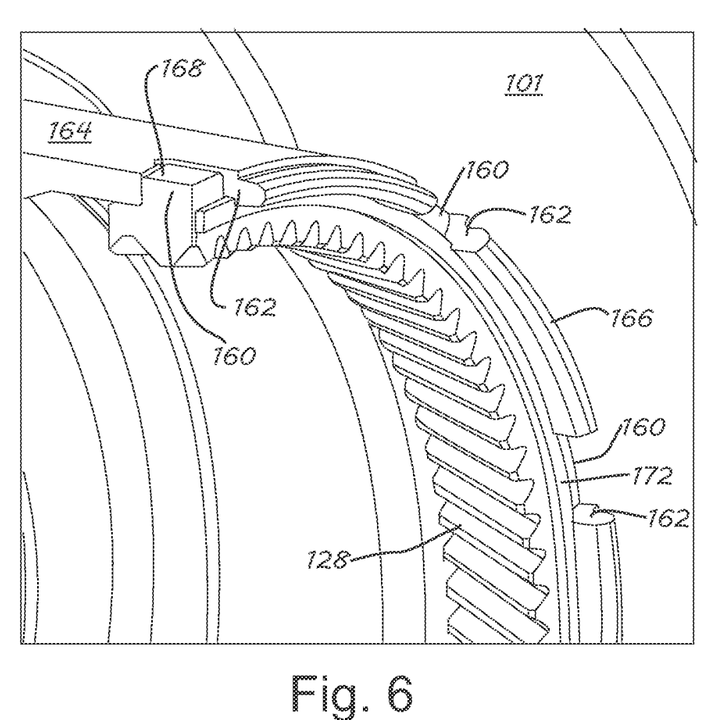
FIG. 6 illustrates an outline, isometric, schematic, sectioned view of part of the electric power unit of FIG. 3.
Figure 7:
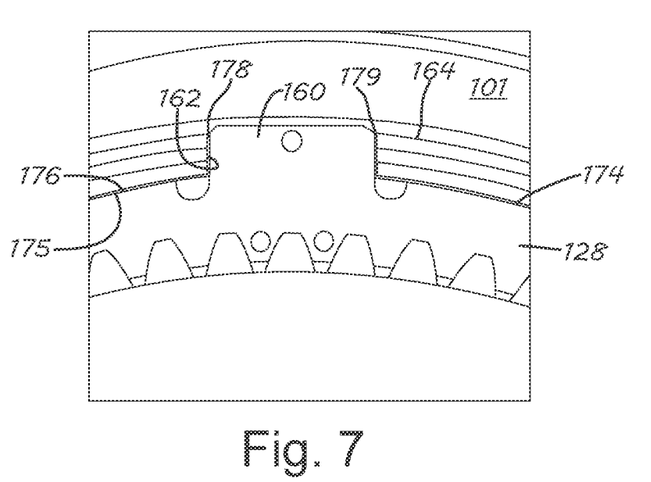
FIG. 7 illustrates a schematic outline view of part of the electric power unit of FIG. 3.

Referring to FIG. 6, a number of variations may include the gear 128, which may be grounded to the case 101. In the power unit 60 the one or more gears 126 may each have three meshes, one with the gear 122, one with the gear 128, and one with the gear 136. In a variation with three gears 126, nine total meshes may result. Balancing the load on the one or more gears 126 may be assisted through a set of tabs 160 and mating slots 162 for the transmission of torque. The case 101 may include an annular wall 164 that may project over the gear 128. The slots 162 may be formed by the wall 164, extending in through its terminal end 166. The gear 128 may have a number of the tabs 160 each of which may project radially outward. Each of the tabs 160 may be received within its respective slot 162 and the gear 128 may be secured axially by a retaining ring 172 that may be secured to the wall 164. With additional reference to FIG. 7, a radial clearance 174 may be provided between an outer diameter 176 of the gear 128 and an inner diameter 175 of the wall 164. The radial clearance 174 may allow the gear 128 to move radially with respect to the case 101 to find a position where the load on the gears 126 is shared equally. Clearance space 178 and 179 may be provided between each tab 160 and the wall 164 within each slot 162. The clearance space 178, 179 may allow the gear 128 to move angularly relative to the case 101 an amount equal to the clearance space. The clearance space 178, 179 may be selected to allow for compensation of variations in gearing such as may result from manufacturing tolerance. Angular movement of the gear 128 may support condensed packaging of the power unit 60, while providing extended service and reduced noise and vibration.

Figure 8:
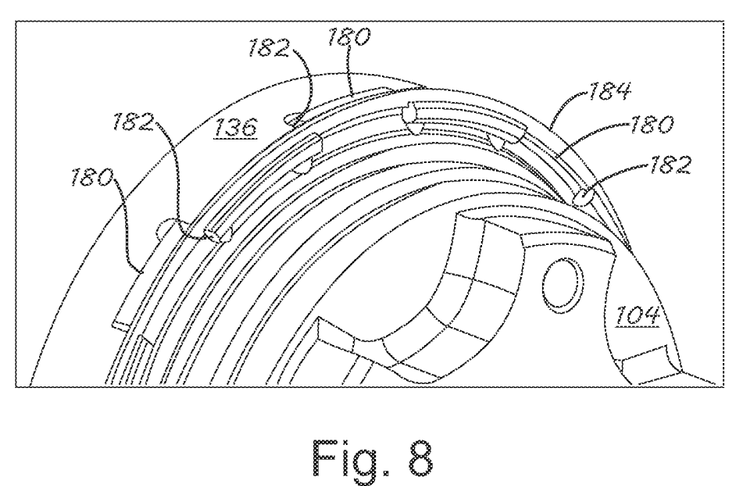
FIG. 8 illustrates an isometric outline view of part of the electric power unit of FIG. 3.
Figure 9:
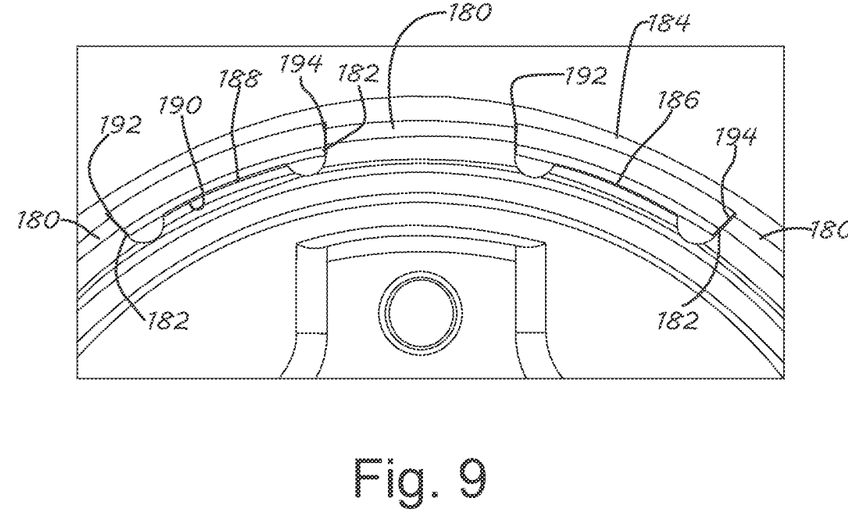
FIG. 9 illustrates a schematic outline view of part of the electric power unit of FIG. 3.
Figure 10:
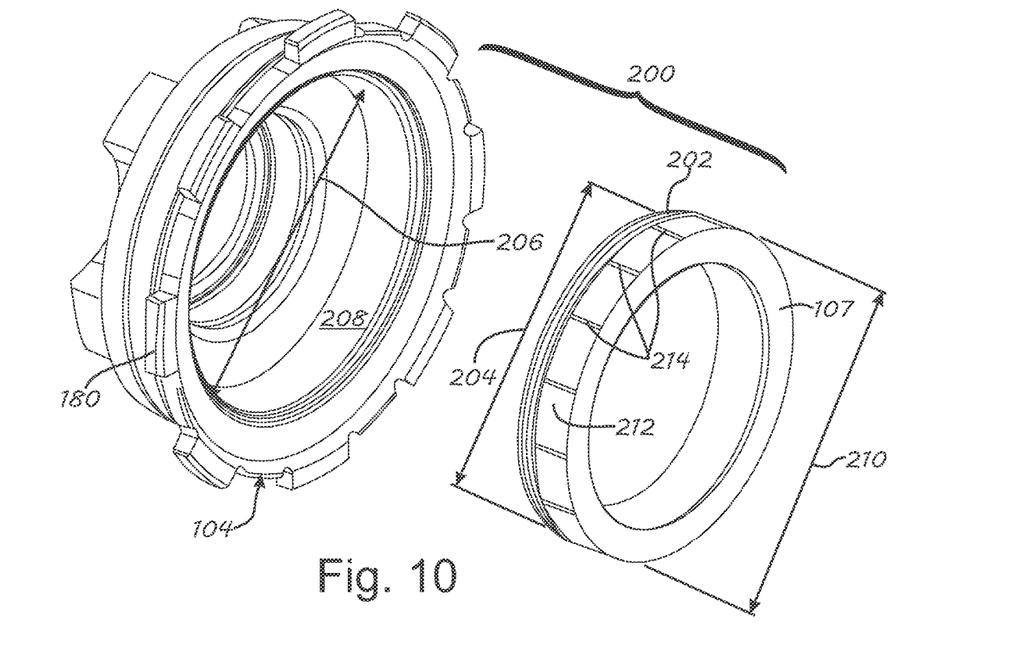
FIG. 10 illustrates an outline isometric exploded view of part of the electric power unit of FIG. 3.

Referring to FIG. 8, in a number of variations the gear 136 may be engaged with the drive collar 104. The drive collar 104 may be rotationally supported on the case 101 by the bearings 109 as shown in FIG. 3. The drive collar may rotate within the bearings 109 but may be restrained axially. Angular motion of the gear 136 relative to the drive collar 104 may be allowed so that equal load share among the gears 126 is achieved. As a result, noise and vibration may be reduced and service may be extended. Angular movement may be accomplished through a shape connection between the gear 136 and the drive collar 104. The gear 136 may be annular and may include a number of slots 182. The drive collar 104 may include a number of tabs 180 that may project radially outward and that may be received within the slots 182. Torque on the gear 136 may be carried by the tabs 180. The connection may be secured axially with a retaining ring 184 that may be engaged in a slot of the gear 136 and that may capture the tabs 180 in the slots 182. With additional reference to FIG. 9, a radial clearance 186 may be provided between an outer surface 188 of the drive collar 104 and an inner surface 190 of the gear 136. The radial clearance 186 may allow the gear 136 to move radially relative to the drive collar 104, such as to find a position where load on the gears 126 is shared equally. Clearance 192 and 194 may be provided between each tab 180 and the gear 136 within a respective slot 182 to provide limited angular movement. The amount of angular movement may be selected to allow for compensation of variations in gearing such as may result from manufacturing tolerance.

Figure 11:
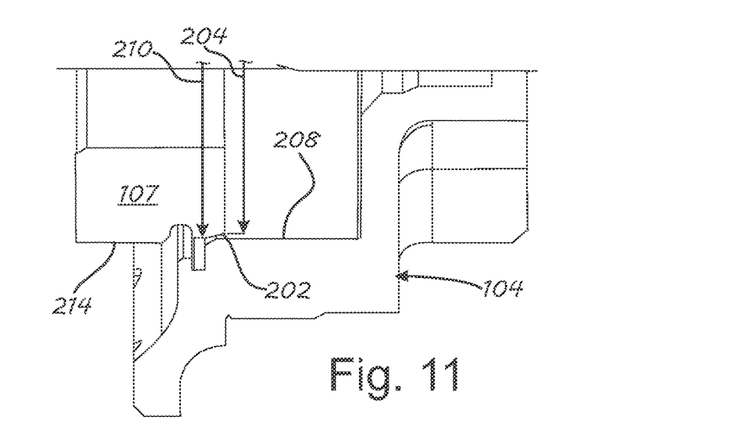
FIG. 11 illustrates an outline sectioned view of part of the electric power unit of FIG. 3 in an assembly stage.
Figure 12:
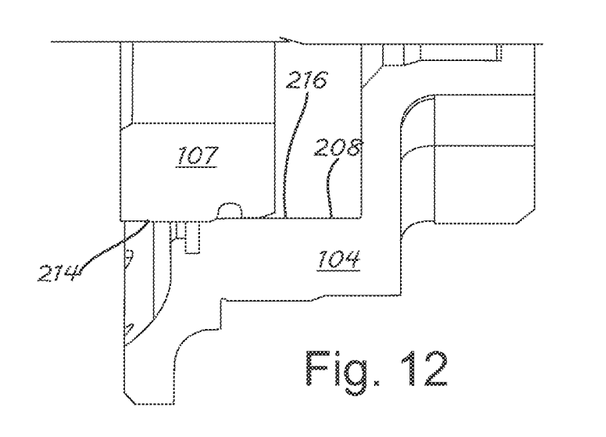
FIG. 12 illustrates an outline sectioned view of part of the electric power unit of FIG. 3 in an assembly stage.
Figure 13:
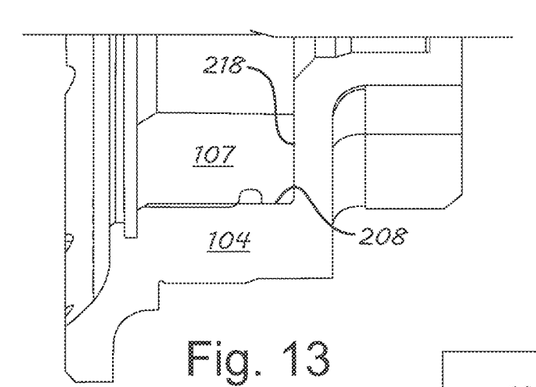
FIG. 13 illustrates an outline sectioned view of part of the electric power unit of FIG. 3 shown assembled.
Figure 14:
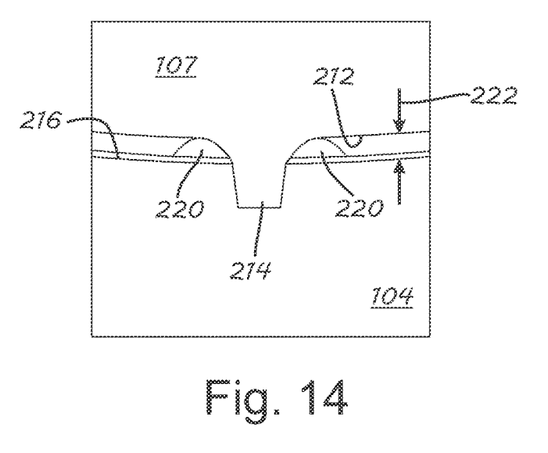
FIG. 14 illustrates a schematic, outline view of part of the electric power unit of FIG. 3 shown assembled.

A number of variations as illustrated in FIGS. 10 through 14 may involve an assembly 200 of the outer race 107 of the engagement coupling 110 with the drive collar 104. The outer race 107 may include a chamfer 202 on a leading edge facing toward the drive collar 104 prior to assembly. The chamfer 202 may have an outside diameter 204 that may be less than an inside diameter 206 of the opening 208 formed in the drive collar 104. The outer race 107 may have a pilot diameter 210 at its outer surface 212. The pilot diameter 210 may be less than the inner diameter 206 and may be greater than the outside diameter 204. The outer surface 212 of the outer race 107 may have a number of knurl spline teeth 214. The teeth 214 may be thin, axially extending structures that project radially outward from the outer race 107. The teeth 214 may be equally distributed around the perimeter of the outer race 107 and may be spaced about 15 to 30 degrees from each other. As illustrated in FIG. 11, the outer race 107 may be inserted into the drive collar 104 with the lead-in chamfer 202 entering the opening 208. The chamfer 202 may center the outer race 107 within the opening 208. The teeth 214 may extend radially outward past the opening 208 and may be formed axially along only a part of the surface of the outer race 107 so as to be spaced away from the chamfer 202. With reference to FIG. 12, as the outer race 107 is further inserted into the opening 208, the teeth 214 engage with the surface 216 of the drive collar 104 within the opening 208. The teeth 214 may cut into the surface 216, which may continue until the outer race 107 reaches the end face 218 of the opening 208 as shown in FIG. 13. As the teeth 214 are pressed into the drive collar 104 under force, material from the teeth and/or the surface 216 may be dislocated as shown in FIG. 14. The dislocated material 220 may be pushed off next to the teeth 214. To accommodate the dislocated material, a radial clearance 222 may be provided between the outer surface 212 at its minor diameter between the teeth 214 and the surface 216 of the drive collar 104. As a result, the outer race 107 may be accurately centered and securely held within the drive collar 104. Torque may be effectively transferred between the outer race 107 and the drive collar 104 when the engagement coupling 110 is engaged in the locked rotational direction. The accurate concentricity achieved may ensure that all the locking elements simultaneously engage.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a propulsion system that may include an electric machine and a gear set that may be operatively connected with the electric machine. A crank shaft may extend through the electric machine and the gear set. A battery array may be disposed around the electric machine and the gear set.

Variation 2 may include the propulsion system according to variation 1 and may include a case surrounding the battery array, the electric machine and the gear set.

Variation 3 may include the propulsion system according to variation 2 wherein the battery array may be disposed in a circular pattern within the case.

Variation 4 may include the propulsion system according to variation 2 wherein the gear set may include a ring gear with tabs. The case may define slots within which the tabs may be positioned. Clearance may be provided between the tabs and the case in the slots so that the ring gear may move relative to the case an amount up to the clearance.

Variation 5 may include the propulsion system according to variation 1 and may include a torque transfer element that may be engaged with the crank shaft. The crank shaft may extend through the torque transfer element.

Variation 6 may include the propulsion system according to variation 1 wherein the gear set may drive a drive collar that may have a number of tabs. A ring gear may have a number of slots, each of which may receive a tab. Clearance may be provided between the tabs and the ring gear in the slots so that the ring gear may move relative to the drive collar an amount up to the clearance.

Variation 7 may include the propulsion system according to variation 1 and may include a drive collar connected to the gear set. An engagement mechanism may have an outer race that may be fixed to the drive collar. An inner race may be connected to the crank shaft. The outer race may include a number of teeth that may cut into the drive collar.

Variation 8 may include the propulsion system according to variation 1 wherein the gear set may include a number of planet gears each with a first pinion that may have first teeth disposed in a first helix angle at a first handed orientation. A second pinion may have second teeth disposed in a second handed orientation and at a second helix angle so that thrust forces generated by the first and second pinions may cancel.

Variation 9 may include the propulsion system according to variation 1 and may include a case that may surround the electric machine and the gear set. The linked element may have a first outermost circumference with a first diameter and the case may have a second outermost circumference with a second diameter. The second diameter may be less than the first diameter.

Variation 10 may include the propulsion system according to variation 1 and may include a crank assembly that may be connected to the crank shaft and through which manual input may be provided to the power unit.

Variation 11 may include the propulsion system according to variation 1 wherein the electric machine may have a rotor that may be connected with the gear set through a torque transfer element that is tubular in shape. The crank shaft may extend through the torque transfer element.

Variation 12 may involve a propulsion system that may include a power unit. An electric machine may be included in the power unit. A gear set may be included in the power unit and may be operatively connected to the electric machine. A battery may be included in the power unit and may power the electric machine. A linked element may be operatively connected to the gear set and may provide output from the power unit.

Variation 13 may include the propulsion system according to variation 12 and may include a wheel. A second linked element may be connected to the wheel. A linking element may engage the linked element with the second linked element.

Variation 14 may include the propulsion system according to variation 13 and may include electronic control devices that may be carried by the power unit. An inverter may be provided in the electronic control devices for changing direct current to alternating current.

Variation 15 may include the propulsion system according to variation 13 and may include a crank shaft that may extend through the power unit. A crank assembly may be connected to the crank shaft for manual power input through the power unit to the wheel.

Variation 16 may include the propulsion system according to variation 12 and may include a torque transfer element that may be engaged with the gear set. A crank shaft may extend through the electric machine, the gear set and the torque transfer element.

Variation 17 may include the propulsion system according to variation 16 and may include a crank assembly that may be connected to the crank shaft through which manual input may be provided to the power unit.

Variation 18 may include the propulsion system according to variation 12 wherein the electric machine may have a rotor that may be connected with the gear set through a torque transfer element that may be tubular in shape. A crank shaft may extend through the torque transfer element. A crank assembly may be connected to the crank shaft through which manual input may be provided to the power unit.

Variation 19 may involve a propulsion system for a cycle and may include a power unit that may be mounted to the cycle. An electric machine may be contained in the power unit. A gear set may be operatively connected to the electric machine and may be contained in the power unit. A battery may power the electric machine and may be contained in the power unit.

Variation 20 may include the propulsion system according to variation 19 and may include a crank assembly that may be operatively connected to the power unit and that may transfer manual input torque to the power unit.

The above description of select variations within the scope of the invention is merely illustrative in nature and, thus, variations or variants thereof are not to be regarded as a departure from the spirit and scope of the invention.

What is claimed is:

1. A propulsion system comprising an electric machine, a gear set operatively connected with the electric machine, a crank shaft extending through the electric machine and the gear set, a battery array disposed around the electric machine and the gear set, and a case surrounding the battery array, the electric machine and the gear set, wherein the gear set includes a ring gear with tabs, and the case defines slots within which the tabs are positioned with a clearance between the tabs and the case in the slots so that the ring gear moves relative to the case an amount up to the clearance.

2. The propulsion system according to claim 1 wherein the battery array is disposed in a circular pattern within the case.

3. The propulsion system according to claim 1 further comprising a torque transfer element engaged with the crank shaft, the crank shaft extending through the torque transfer element.

4. The propulsion system according to claim 1 wherein the gear set drives a drive collar, wherein a number of second tabs are defined by the drive collar, and wherein the gear set further comprises a second ring gear that has a number of second slots, wherein each of the second slots receives one of the second tabs, with a second clearance between the second tabs and the second ring gear in the second slots so that the second ring gear moves relative to the drive collar an amount up to the second clearance.

5. The propulsion system according to claim 1 further comprising a torque transfer element engaged with the gear set, and wherein the crank shaft extends through the torque transfer element.

6. The propulsion system according to claim 1 wherein the gear set includes a number of planet gears each with a first pinion that has first teeth disposed in a first helix angle at a first handed orientation and a second pinion that has second teeth disposed at a second handed orientation and at a second helix angle so that thrust forces generated by the first and second pinions cancel.

7. The propulsion system according to claim 1 further comprising a linked element connected with the gear set, the linked element providing torque output from the electric machine, the linked element having a first outermost circumference with a first diameter and the case having a second outermost circumference with a second diameter, wherein the second diameter is less than the first diameter.

8. The propulsion system according to claim 1 further comprising a crank assembly connected to the crank shaft, wherein the crank shaft is configured to receive manual input.

9. The propulsion system according to claim 1 further comprising a rotor in the electric machine, and a torque transfer element that is tubular in shape and that connects the electric machine with the gear set, the crank shaft extending through the torque transfer element.

10. A propulsion system comprising a power unit, an electric machine in the power unit, a gear set in the power unit operatively connected to the electric machine, a battery in the power unit powering the electric machine, a linked element operatively connected to the gear set providing output from the power unit, a drive collar connected to the gear set, and an engagement mechanism having an outer race fixed to the drive collar and an inner race connected to the crank shaft, a outer race including a number of teeth that cut into the drive collar.

11. The propulsion system according to claim 10 further comprising a wheel, a second linked element connected to the wheel, and a linking element engaging the linked element and the second linked element.

12. The propulsion system according to claim 11 further comprising electronic control devices carried by the power unit, and an inverter in the electronic control devices for changing direct current to alternating current.

13. The propulsion system according to claim 11 wherein the crank shaft extends through the power unit and a crank assembly connected to the crank shaft provides manual power input through the power unit to the wheel.

14. The propulsion system according to claim 10 further comprising a torque transfer element engaged with the gear set, and a crank shaft extending through the electric machine, the gear set and the torque transfer element.

15. The propulsion system according to claim 14 further comprising a crank assembly connected to the crank shaft through which manual input is provided to the power unit.

16. The propulsion system according to claim 10 further comprising a rotor in the electric machine, a torque transfer element that is tubular in shape and that connects the electric machine with the gear set, wherein the crank shaft extends through the torque transfer element, and a crank assembly connects to the crank shaft through which manual input is provided to the power unit.

17. A propulsion system for a cycle comprising a power unit mounted to the cycle, an electric machine contained in the power unit, a gear set operatively connected to the electric machine and contained in the power unit, and a battery powering the electric machine and contained in the power unit, wherein the gear set includes a number of planet gears each with a first pinion that has first teeth disposed in a first helix angle at a first handed orientation and a second pinion that has second teeth disposed at a second handed orientation and at a second helix angle so that thrust forces generated by the first and second pinions cancel.

18. The propulsion system according to claim 17 further comprising a crank assembly operatively connected to the power unit and transferring manual input torque to the power unit.

* * * * *